United States Patent [19]
Harris et al.

[11] Patent Number: 5,952,559
[45] Date of Patent: Sep. 14, 1999

[54] FUEL CAP LEAKAGE TESTER

[75] Inventors: Robert S. Harris; Bruce K. Bowden, both of Connersville; Dean C. Foltz, Shelbyville, all of Ind.

[73] Assignee: Stant Manufacturing Inc., Connersville, Ind.

[21] Appl. No.: 08/974,857

[22] Filed: Nov. 20, 1997

Related U.S. Application Data

[60] Provisional application No. 60/031,091, Nov. 20, 1996.

[51] Int. Cl.[6] .............................. G01M 3/32; G01M 3/28; B65D 6/12
[52] U.S. Cl. ............................ 73/49.7; 73/40; 73/118.1; 220/DIG. 33; 123/518
[58] Field of Search ................................ 73/49.7, 49.2, 73/117.3, 118.1, 40; 123/518; 220/86.2, DIG. 33

[56] References Cited

U.S. PATENT DOCUMENTS

| | | | |
|---|---|---|---|
| 2,847,857 | 8/1958 | Enell | 73/40 |
| 2,940,301 | 6/1960 | Hughes et al. | 73/40 |
| 2,940,303 | 6/1960 | Enell | 73/45.8 |
| 3,014,361 | 12/1961 | Black | 73/40 |
| 3,022,658 | 2/1962 | Black | 73/40 |
| 3,138,949 | 6/1964 | Pipes | 73/40 |
| 3,807,219 | 4/1974 | Wallskog | 73/40 |
| 3,817,097 | 6/1974 | Heroux | 73/168 |
| 3,852,996 | 12/1974 | Klaubert et al. | 73/40.5 R |
| 4,071,838 | 1/1978 | Block | 338/47 |
| 4,235,100 | 11/1980 | Branchini | 73/49.7 |
| 4,494,402 | 1/1985 | Carney | 73/40 |
| 4,497,290 | 2/1985 | Harris | 123/179 G |
| 4,584,885 | 4/1986 | Cadwell | 73/862.61 |
| 4,597,003 | 6/1986 | Aine et al. | 357/26 |
| 4,600,934 | 7/1986 | Aine et al. | 357/26 |
| 4,698,999 | 10/1987 | Trick et al. | 73/49.8 |
| 4,783,237 | 11/1988 | Aine et al. | 437/15 |
| 4,794,790 | 1/1989 | Margarit-Metaxa et al. | 73/117.3 |
| 4,877,146 | 10/1989 | Harris | 220/85 VR |
| 4,996,627 | 2/1991 | Zias et al. | 361/283 |
| 5,019,783 | 5/1991 | Cadwell | 324/662 |
| 5,028,876 | 7/1991 | Cadwell | 324/678 |
| 5,048,165 | 9/1991 | Cadwell | 29/25.41 |
| 5,049,421 | 9/1991 | Kosh | 428/34.4 |
| 5,069,062 | 12/1991 | Malecek et al. | 73/49.7 |
| 5,146,902 | 9/1992 | Cook et al. | 123/518 |
| 5,158,054 | 10/1992 | Otsuka | 123/198 D |
| 5,193,381 | 3/1993 | Heimann | 73/49.7 |
| 5,323,640 | 6/1994 | Porcaro et al. | 73/40 |
| 5,467,641 | 11/1995 | Williams et al. | 73/49.7 |
| 5,495,749 | 3/1996 | Dawson et al. | 73/49.7 |
| 5,507,176 | 4/1996 | Kammeraad et al. | 73/49.2 |
| 5,509,296 | 4/1996 | Kolb | 73/40.5 R |
| 5,756,882 | 5/1998 | Cranfill et al. | 73/46 |

FOREIGN PATENT DOCUMENTS

| | | |
|---|---|---|
| 2635823 | 8/1988 | France . |
| 4-131729 | 5/1992 | Japan . |

Primary Examiner—Michael Brock
Assistant Examiner—J. David Wiggins
Attorney, Agent, or Firm—Barnes & Thornburg

[57] ABSTRACT

A fuel cap tester kit containing a plurality of fuel cap adapters, wherein each adapter has a mouth opening, outer rim, cap receiving chamber, air supply passageway and a fuel cap connection opening and with each fuel cap opening being configured to engage and retain a different and specifically configured fuel cap, and wherein each adapter is also provided with a threaded base connection that cooperates with a complimentary threaded connection on a test base that is fluidly connected to a pressure source and tester apparatus and wherein the base connectors of each adapter are configured alike so that each adapter can be connected to the single threaded connector in the test base to permit testing of different size fuel caps dependent on the adapter threaded into the test base, where the tester kit is used to decide upon quality of fuel caps under test by determining a leakage rate of pressurized air from the cap-receiving chamber through the mouth opening.

46 Claims, 10 Drawing Sheets

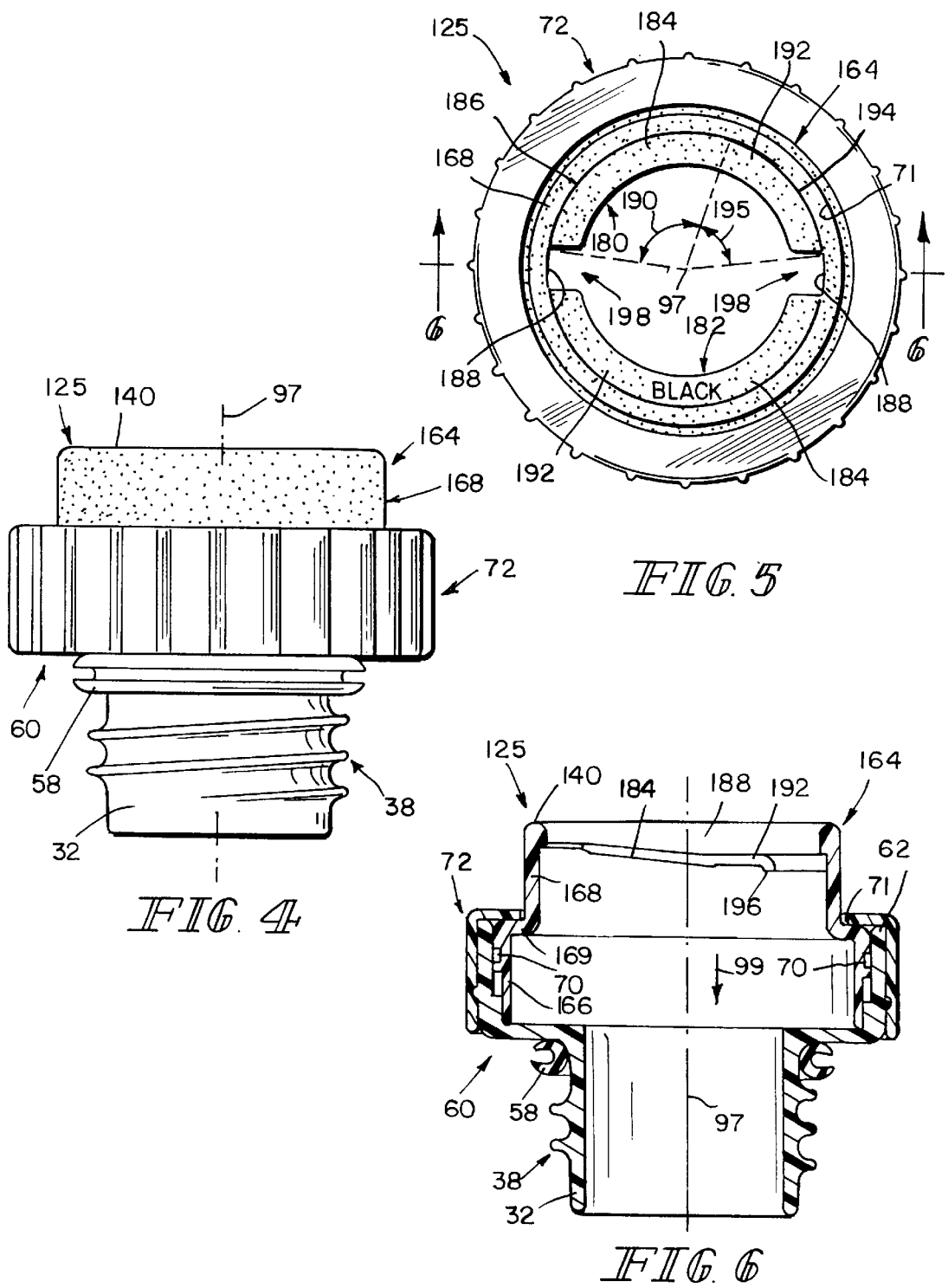

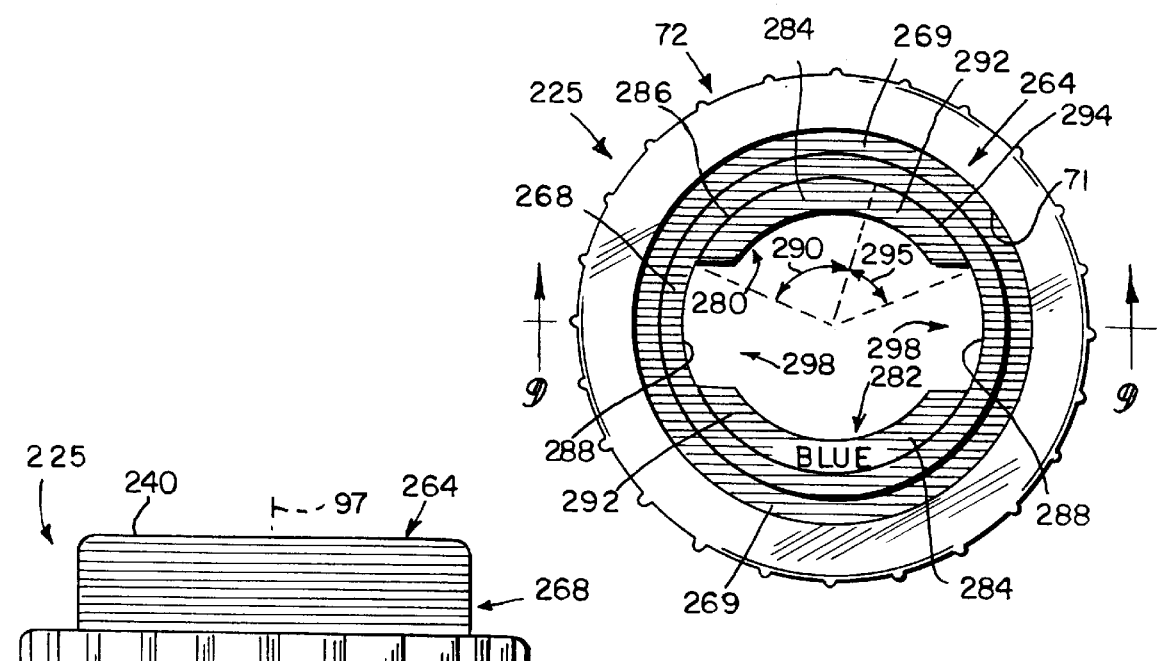
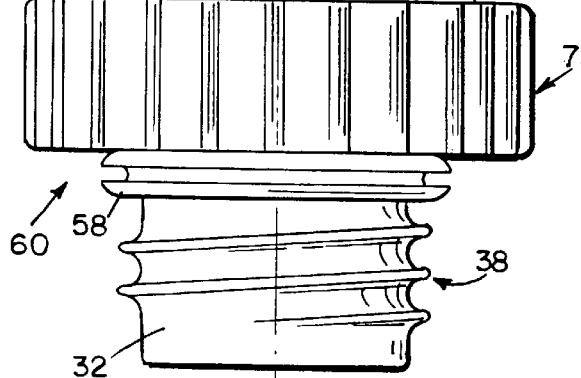
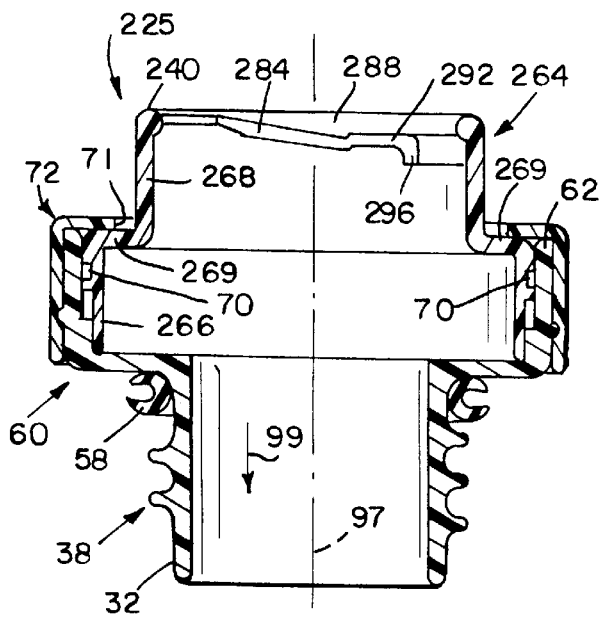

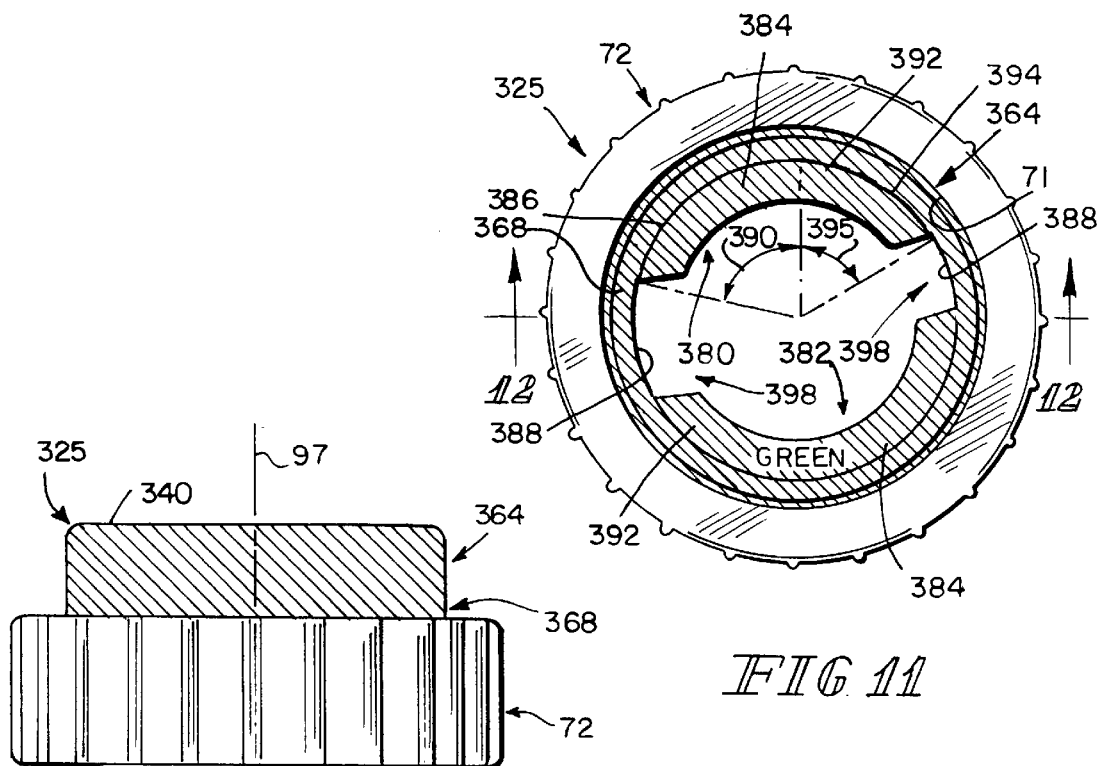
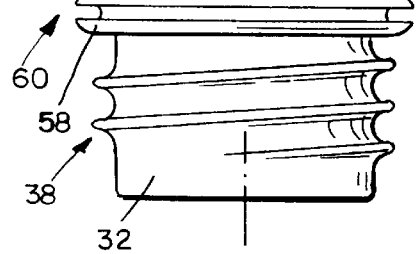
FIG. 10
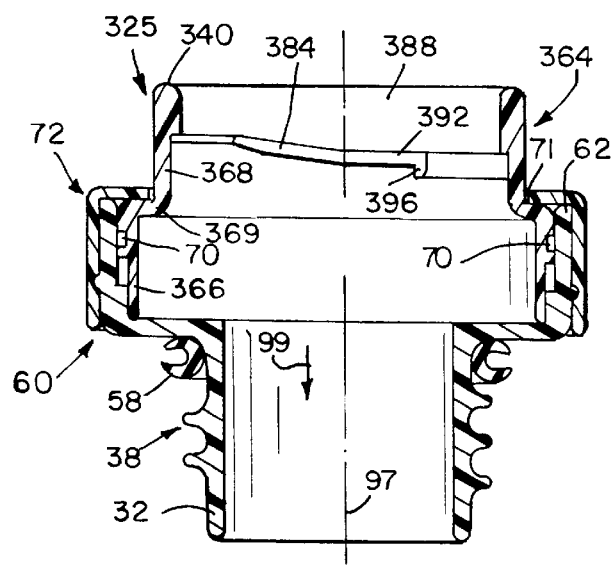
FIG. 12
FIG. 11

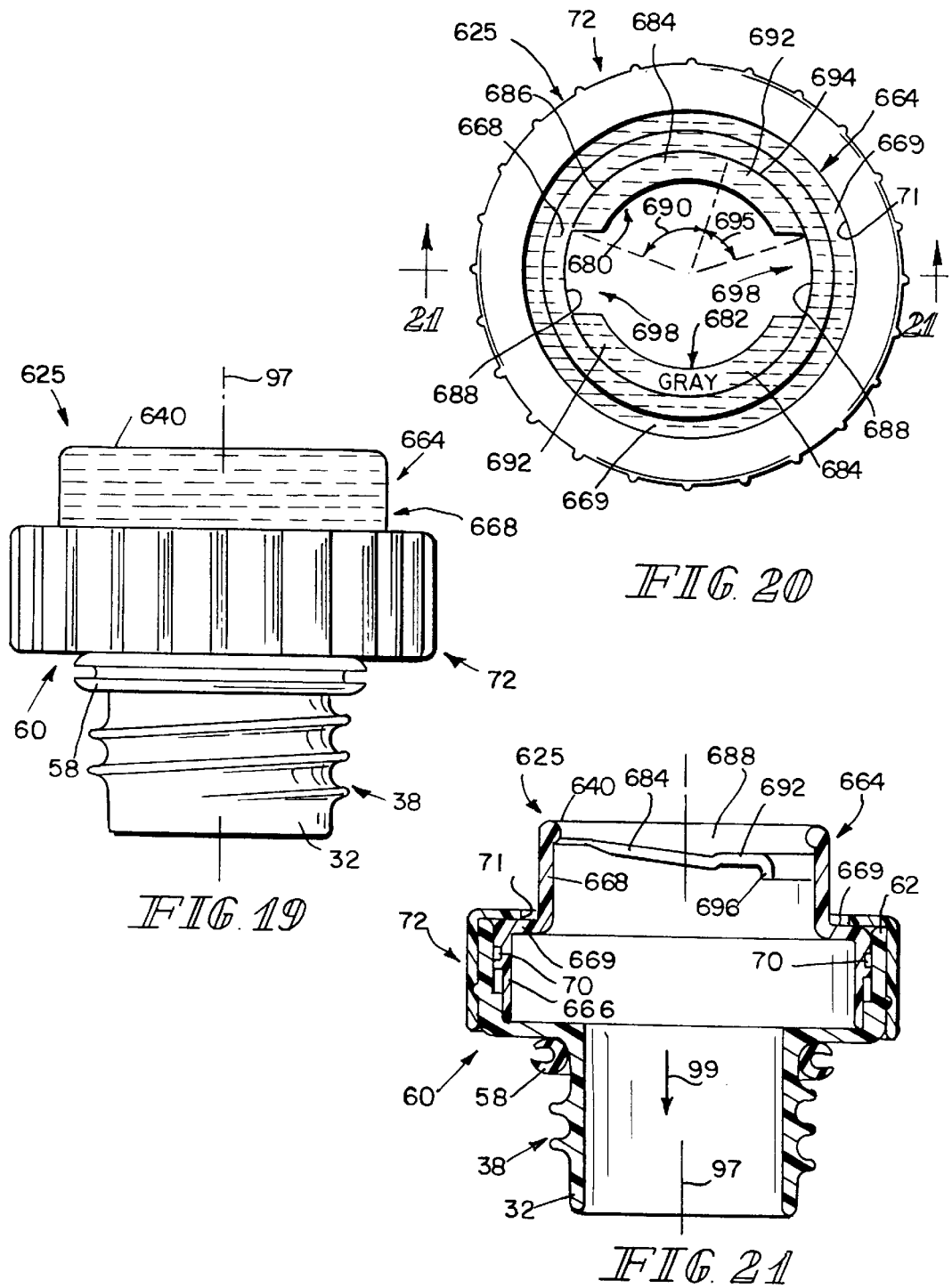

FUEL CAP LEAKAGE TESTER

This application claims the benefit of Provisional Application Ser. No. 60/031,091, filed Nov. 20, 1996.

BACKGROUND AND SUMMARY OF THE INVENTION

The present invention relates generally to fuel caps for providing a sealed closure on a vehicle fuel tank filler neck, and particularly to a tester for field testing the leakage level of a wide variety of fuel caps. More particularly, the present invention relates to fixtures for receiving caps to be tested for leakage and connecting those caps to fuel cap leakage tester apparatus.

In-Use Maintenance (I/M regulations enforced in many states require the inspection, diagnosis, and repair of fuel system liquid and vapor leaks as part of yearly vehicle testing. More specifically, the testing requirement is included in the I/M 240 regulation. A tester for determining whether a fuel cap for providing a sealed closure on a vehicle fuel tank filler neck leaks at a rate that is equal to or less than a specified maximum acceptable fuel cap leak rate is disclosed in PCT/US96/13415, entitled "Fuel Cap Leakage Tester," to Robert S. Harris, filed on August 16, 1996.

Fuel caps are configured to be coupled to filler necks in many different ways so as to provide a sealed closure for the open mouth of a tank filler neck. Cam-on fuel caps include cam lugs or bayonet-type lugs for engaging filler neck flanges and threaded fuel caps includes external threads for engaging internal filler neck threads. The lugs and threads operate to retain a fuel cap in a fully tightened position closing the open mouth of a filler neck.

Fuel caps come in a wide variety of shapes and sizes and the cam lugs and external threads provided on fuel caps also come in a wide variety of shapes and sizes. These cap, lug, and thread styles vary by vehicle model and model year.

What is needed is a support fixture that can receive a fuel cap during an inspection conducted using a cap-pressurizing fuel cap leakage tester to determine whether the fuel cap passes a pressure-based fuel cap leakage test. Inspectors would welcome a support fixture that is adaptable readily in the field to accept more than one style of fuel cap so that fuel caps associated with a wide variety of vehicle models and model years can be tested quickly and easily using a single fuel cap leakage tester.

According to the present invention, a fuel cap tester comprises a test base connectable to a source of pressurized air and a cap adapter connectable to the test base. The test base is formed to include a base chamber and a pressurized air supply conduit in communication with the base chamber. The cap adapter connects to the test base at one end and retains a fuel cap to be tested at another end to place the fuel cap in communication with pressurized air passed into the base chamber through the pressurized air supply conduit.

In preferred embodiments, the fuel cap tester further comprises a test unit including a housing containing a source of pressurized air and a flow connector coupling the source of pressurized air to the pressurized air supply conduit that is coupled to the base chamber in the test base to supply pressurized air to the base chamber during a fuel cap leakage test. A mechanism is provided in the test unit for comparing air pressure leakage from the base chamber in the test base past a fuel cap coupled to the test base (directly or via the cap adapter) to determine if the leakage of the cap is equal to or different from a maximum acceptable leak rate.

In preferred embodiments, the cap adapter includes a tubular member formed to include a cap-receiving chamber, a flange around the tubular member, and an O-ring seal around the tubular member adjacent to the flange. The tubular member includes an axially inner end and an axially outer end. The tubular member further includes an inner portion positioned to lie between the axially inner end and the O-ring seal and sized to fit in the base chamber formed in the test base.

The cap adapter couples a fuel cap to be tested to the test base. A base connector on the inner portion of the tubular member couples the cap-receiving chamber in the cap adapter in fluid communication with the base chamber in the test base. A fuel cap connector on the axially outer end of the tubular member retains a fuel cap to be tested in the cap-receiving chamber in the cap adapter.

In other preferred embodiments, a fuel cap tester kit comprises a test base and at least two cap adapters. A first of the cap adapters is configured to retain a first style of fuel cap in a mounted position on the first cap adapter. A second of the cap adapters is configured to retain a second style of fuel cap different from the first style of fuel cap in a mounted position on the second cap adapter. Additional cap adapters configured to retain additional styles of fuel caps can be included in the fuel cap tester kit to facilitate coupling a wide variety of fuel cap styles to the test base.

To test the leakage rate of a fuel cap to be tested, a technician first selects a cap adapter configured to retain the fuel cap to be tested from among the available cap adapters, couples the cap adapter to a test base, and couples the fuel cap to be tested to the cap adapter. The technician then uses the fuel cap leakage tester to supply pressurized air to the cap adapter through the test base and measures a leakage rate of pressurized air from the cap adapter past the fuel cap to be tested that is coupled to the cap adapter. If the measured leakage rate is less than a predetermined acceptable rate, then the fuel cap passes the leakage test. However, if the measured leakage rate is greater than the predetermined acceptable rate, then the fuel cap fails the leakage test.

Another aspect of the present invention is the test base itself. The test base includes internal threads in its base chamber for mating with a wide variety of threaded fuel caps. In a presently preferred embodiment the profile, pitch, and diameter of these internal threads is defined to fit nearly all common fuel cap thread profiles.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIGS. 4–6 show several views of a first of the six cap adapters, which cap adapter includes a "black" color-coded upper part;

FIGS. 7–9 show several views of a second of the six cap adapters, which cap adapter is configured to include a "blue" color-coded upper part;

FIGS. 10–12 show several views of a third of the six cap adapters, which cap adapter includes a "green" color-coded upper part;

FIGS. 19–21 show several views of a sixth of the six cap adapters, which cap adapter includes a "gray" color-coded upper part;

FIG. 22 is a schematic diagram showing manual actuation of a push button included in a test actuator switch to open a normally closed flow control valve included in the switch to cause pressurized air to flow from a reservoir chamber in the tester unit through (1) a first control orifice "CO1," a first passage, and then a calibrated master orifice "MO" to reach the atmosphere and (2) a second control orifice "CO2" (equal in diameter to the first control orifice) and then a second passage to reach the test base and showing illumination of a failing signal light "F" on the electronics module in response to a signal from a fuel cap leakage detector "F/P" comparing air pressure in the first passage to air pressure in the second passage, thus indicating that the flow rate of pressurized air leaking from the cap adapter past the cap to be tested is greater than the flow rate of pressurized air through the master orifice (which is calibrated at the specification limit for acceptable leakage) signifying that the fuel cap installed in the cap adapter that is coupled to the test base has failed the fuel cap leakage test; and FIG. 23 is a diagram similar to FIG. 22 showing illumination of the passing signal light "P" on the electronics module in response to a signal from the fuel cap leakage detector "F/P" that air pressure in the second passage (between the second control orifice and the test base) is greater than air pressure in the first passage (between the first control orifice and the master orifice)—and thus the flow rate of pressurized air leaking from the cap adapter (if any) is less than the flow rate of pressurized air through the master orifice (which is calibrated at the specification limit for acceptable leakage) signifying that the fuel cap installed in the cap adapter that is coupled to the test base has passed the fuel cap leakage test.

DETAILED DESCRIPTION OF THE DRAWINGS

Figure 1:
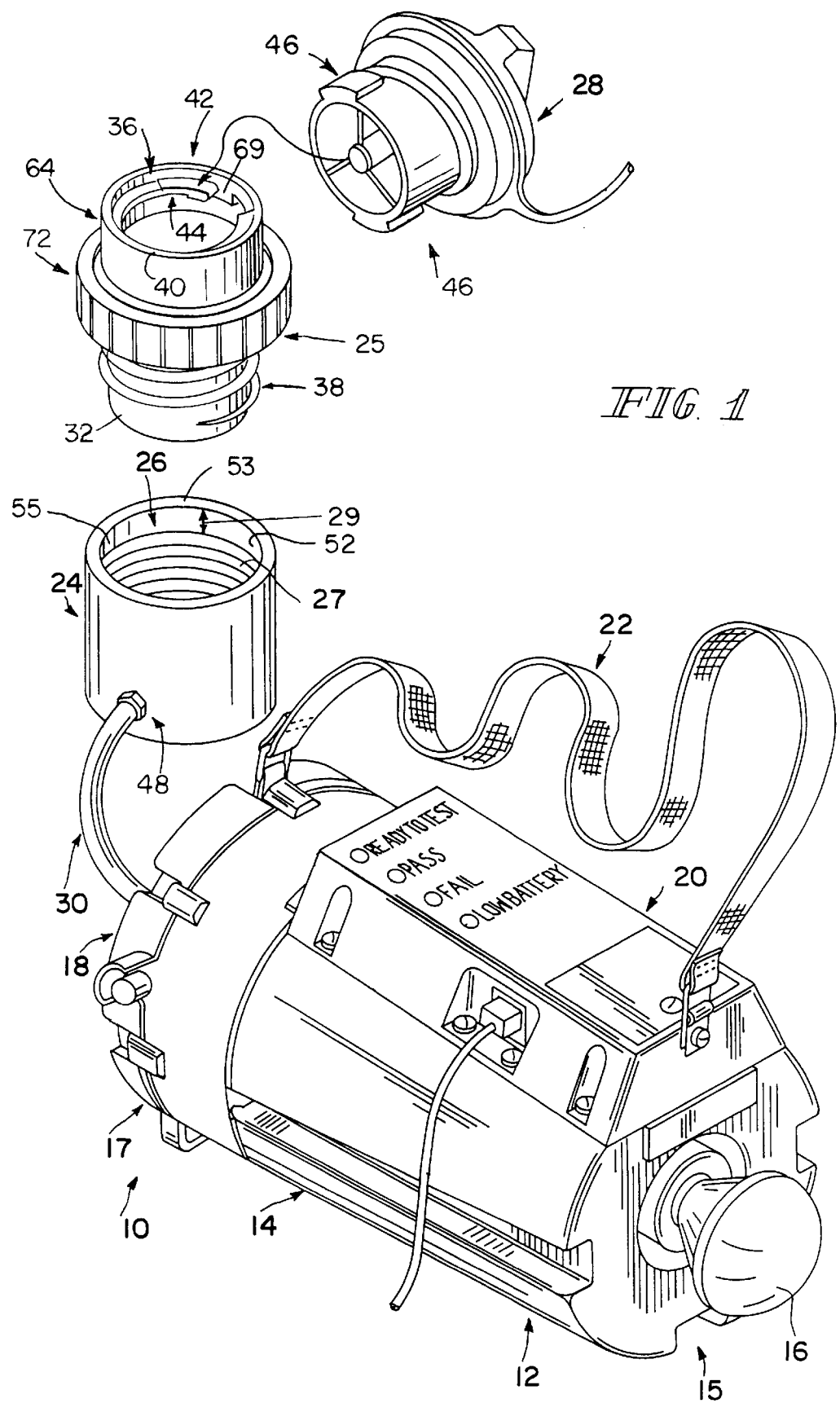
FIG. 1 is a perspective view of a fuel cap leakage tester in accordance with a presently preferred embodiment of the present invention showing a cap to be tested, a fuel cap leakage tester including a test base formed to include a base chamber, a tester unit including a tester housing, a pump handle mounted at a top end of the tester housing, a push button for a test actuator switch mounted at an opposite bottom end of the tester housing, an electronics module on the tester handling including ready-to-test, pass, fail, and low battery signal lights, a shoulder strap coupled to the tester housing, a pressurized air supply hose extending between the bottom end of the tester housing and the test base that is formed to include a base chamber, and a cap adapter having one end configured to engage the test base in the base chamber and an opposite end configured to engage a cap to be tested during a test procedure.

Referring now to FIG. 1, a fuel cap leakage tester 10 includes a test unit 12 including a housing 14 having a right-side end 15 carrying a pump handle 16 and a left-side end 17 carrying an end cover 18, and an electronics module 20 mounted on housing 14. A shoulder strap 22 has one end coupled to housing 14 and another end coupled to electronics module 20 and is provided to enhance the portability of the test unit 12. Tester 10 is operable to make it quick and easy for any state emissions testing service or other user to test fuel caps accurately for leaks for compliance with current EPA regulations.

Tester 10 further includes a test base 24 formed to include a base chamber 26. Test base 24 is configured to receive either a threaded fuel cap to be tested (not shown) or a cap adapter 25 which is configured to receive a fuel cap 28 to be tested. It is contemplated that some caps to be tested will mount directly in test base 24 while other caps to be tested will mount in a cap adapter 25 which is mounted in test base 24.

In the case of a threaded fuel cap, the threaded fuel cap can be engaged with internal threads 27 formed in test base 24 prior to leakage testing the threaded cap. If a cap to be tested is not threaded or has threads that do not mate satisfactorily with internal threads 27 provided in test base 24, then the cap (e.g., 28) to be tested can be installed on one end of cap adapter 25 and the other end of cap adapter 25, which end is threaded, can be installed in base chamber 26 due to mating engagement of the threads on cap adapter 25 with internal threads 27 in base chamber 26 of test base 24.

Figure 2:
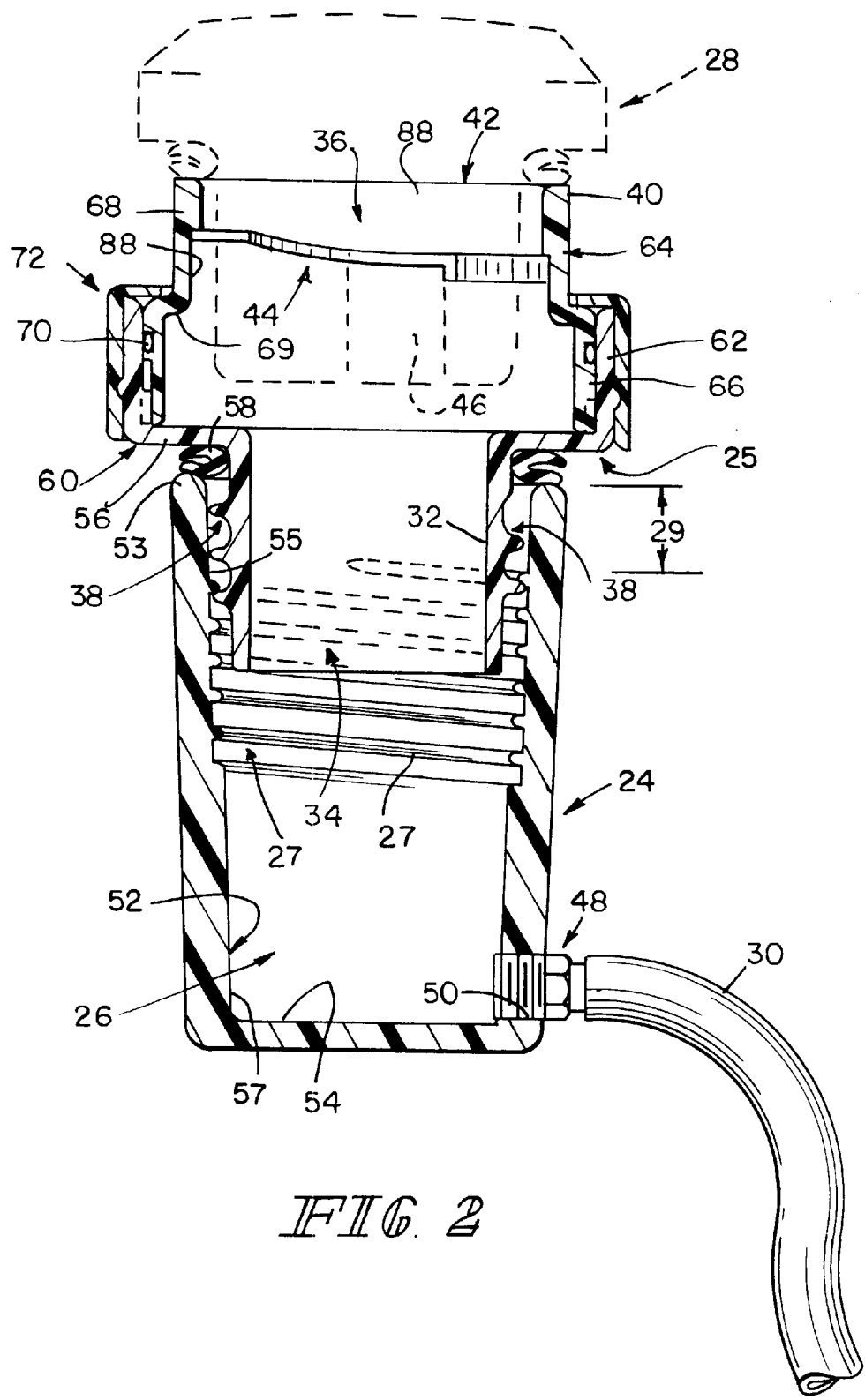
FIG. 2 is a sectional view of the cap adapter of FIG. 1 installed in the test base of FIG. 1 to establish a sealed connection between the cap adapter and the test base and showing the cap to be tested of FIG. 1 in phantom in a mounted position in the cap adapter.

Referring to FIG. 2, it will be seen that, in a preferred embodiment, test base 24 is designed with oversized internal diameter female threads 27 with a metric pitch which is an exact match for the most commonly used European fuel cap threads. This permits an exact fit for these caps. The start point for these threads 27 is axially offset from the mouth of the test base 24 by an offset dimension 29 to produce a non-threaded portion 55 for clearance to a shoulder which is provided on some caps. The offset dimension 29 of 0.525 inch (1.3335 cm) is also chosen to allow only the first one-half (approximately) of the standard U.S. S.A.E. threaded cap profile to enter the test base 24 before the cap seal engages the mouth of the test base 24. The limited engagement of the S.A.E. thread ensures the cap is tight for the low-pressure test but not engaged in the test base to the point the mismatched thread pitch of the U.S. S.A.E. and metric threads would result in binding and the cap not be engaged far enough to seal. An additional advantage to the operator is that the quick on-and-off action reduces the time required for installation compared to a customary two and one-half turns needed to install a conventional fuel cap on a filler neck, permitting faster test cycles. The ability to fit nearly all common thread profiles with a single test base 24 increases the utility of the tester to the operator. In a presently preferred embodiment, threaded caps to be tested are coupled directly to test base 24 and bayonet-type or cam-on caps to be tested are coupled to a cap adapter 25 that is coupled to test base 24.

It is within the scope of the present invention to provide a set of cap adapters, each of which has one end for engaging threads 27 in base chamber 26 and another end for receiving a particular "style" of fuel cap so that virtually any fuel cap can be coupled to test base 24 by mounting the cap to be tested in its companion cap adapter and then installing the cap adapter in base chamber 26 of test base 24. Tester 10 also includes a pressurized air supply hose 30 for conducting pressurized air from housing 14 to base chamber 26 to enable an inspector to apply pressurized air to the cap 28 to be tested that is coupled to test base 24 or mounted in a cap adapter 25 coupled to test base 24 during a fuel cap leakage test conducted using tester 10. The structure, function, and operation of tester 10 is disclosed in detail in co-pending application Ser. No. PCT/US96/13415, entitled "Fuel Cap Leakage Tester," to Robert S. Harris, filed on Aug. 16, 1996, the subject matter of which is incorporated by reference herein.

Referring now to FIG. 2, cap adapter 25 is formed to include a pressurized air supply passageway 34 that is adapted to receive pressurized air extant in base chamber 26 formed in test base 24 and a cap-receiving chamber 36 that is adapted to receive a fuel cap 28 to be tested therein. Cap-receiving chamber 36 is coupled in fluid communication to the pressurized air supply passageway 34 to receive pressurized air extant in supply passageway 34. Cap adapter 25 includes a connector 38 adapted to engage test base 24 to communicate pressurized air from base chamber 26 to cap-receiving chamber 36 through pressurized air supply passageway 34.

Cap adapter 25 also includes an outer rim 40 providing a mouth 42 opening into the cap-receiving chamber 36. Cap adapter 25 further includes a retainer 44 adapted to retain a filler neck closure portion 46 of fuel cap 28 to be tested in a mounted position extending into cap-receiving chamber 36 and closing the mouth 42 opening into cap-receiving chamber 36 as shown in FIG. 2 preparatory to determining a leakage rate of pressurized air from cap-receiving chamber 36 through the mouth 42 using tester 10. Retainer 44 includes a pair of annular flanges 80, 82 as shown in FIGS. 1 and 2. In use, these annular flanges 80, 82 will engage lugs 46 on fuel cap 28 to block withdrawal of fuel cap 28 from cap-receiving chamber 36 in cap adapter 25 as shown, for example, in FIG. 2.

As shown in FIG. 2, a first cap adapter 25 is configured to retain a first "style" of fuel cap in a mounted position in the cap-receiving chamber 36 formed in the first cap adapter 25. The word "style" is used herein to refer to a type of configuration of mounting member on a fuel cap that enables the fuel cap to be installed in a filler neck. For example, some fuel caps have threaded mounting members and other fuel caps have bayonet-type mounting members or lugs. It is known to provide several different types of threaded mounting members as well as several different types of bayonet or cam-on mounting members. Each of the cap adapters disclosed herein is configured to have a retainer that is suited for holding a particular type or class of fuel caps having either threaded or bayonet-type mounting members. Fuel cap mounting members come in a wide variety of shapes, configurations, sizes, etc. which vary by vehicle model and model year.

As shown in FIG. 2, a hose connector 48 is coupled to air supply hose 30 and test base 24 to hold air supply hose 30 in fluid communication with a pressurized air supply conduit 50 formed in test base 24 to enable pressurized air generated in tester housing 14 to pass from air supply hose 30 to base chamber 26 through pressurized air supply conduit 50. Test base 24 includes a side wall 52 and a bottom wall 54 coupled to side wall 52. Side wall 52 and bottom wall 54 cooperate to define base chamber 26. Side wall 52 is formed to include an outer rim 53, internal threads 27, an upper wall portion 55 lying between outer rim 53 and threads 27, and a lower wall portion 57 lying between threads 27 and bottom wall 54.

Cap adapter 25 further includes a tubular member 32 formed to include the pressurized air supply passageway 34. Cap adapter 25 also includes an annular flange 56 adjacent to tubular member 32 and an O-ring seal 58 abutting tubular member 32 and annular flange 56. As shown in FIG. 2, connector 38 is appended to tubular member 32 and is defined by external threads formed on tubular member 32 to position O-ring seal 58 between the external threads 38 and annular flange 56.

Although retainer 44 is shown in FIG. 2 and other figures disclosed herein as a pair of flanges for retaining a bayonet-type member on a fuel cap, it is also within the scope of the disclosure to provide internal threads in cap-receiving chamber 36 of cap adapter 25 instead of flanges 44 so that a threaded fuel cap to be tested can be installed in cap-receiving chamber 36 in cap adapter 25. Any internal threads (not shown) provided in cap-receiving chamber 36 would be configured to mate with external threads on the fuel cap to be tested.

As shown in FIG. 2, cap adapter 25 includes a lower part 60 which includes tubular member 32, radially outwardly extending annular flange 56, and upright cylindrical portion 62. Cap adapter 25 also includes an upper part 64 which includes an axially inner annular portion 66 configured to mate with and engage cylindrical portion 62, an axially outer portion 68 which carries retainer 54 along an inner wall 88 thereof and is formed to provide outer rim 40, and a horizontal transition section 69 coupling portion 66 to portion 68. An O-ring seal 70 is positioned to establish an annular seal between parts 62 and 66 as shown in FIG. 2. An outer ring 72 is provided to couple upper and lower parts 64 and 60 together to form a unified cap adapter 25 as shown in FIG. 2.

Axially upper part 64, as shown in more detail in the later drawings, in a preferred embodiment, is molded using a color-coded plastics material to provide a visual indication to a user of fuel cap leakage tester 10 and cap adapter 25 as to which style of cap is able to be mounted in cap adapter 25. As shown in FIG. 2, the cap adapter 25 is made of interchangeable parts so that it is possible to provide a basic lower portion 60 and assembly ring 72 and O-ring seals 58 and 70, and insert into that basic assembly any one of many interchangeable, color-coded, axially upper parts like upper part 64, each of which is configured to receive and retain a particular style of fuel cap to be tested.

Figure 3:
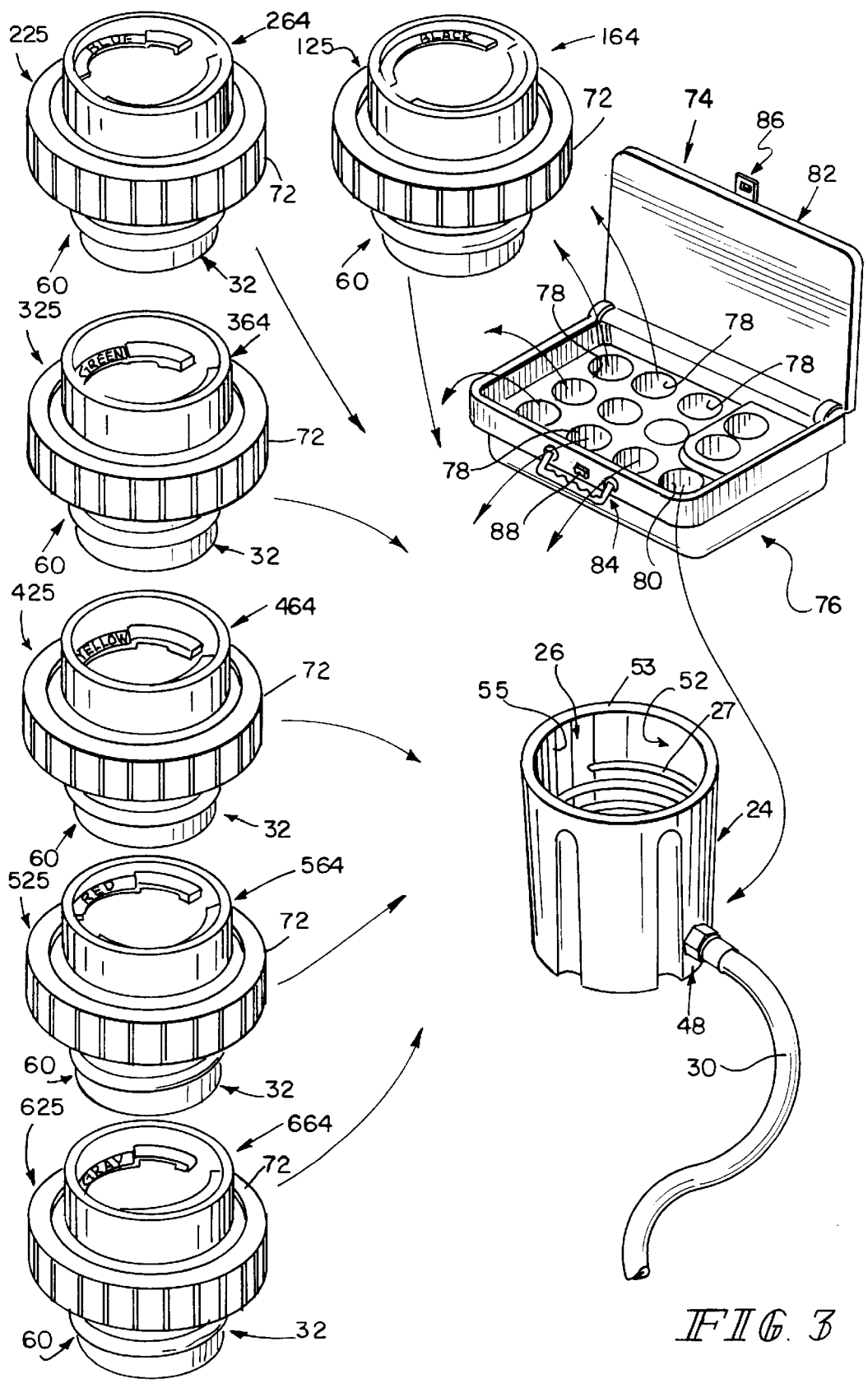
FIG. 3 is a perspective view of a fuel cap tester kit having component parts capable of being assembled in the field at a fuel cap leakage testing site to provide a cap support fixture that is configured to accept and test more than one style of fuel cap and showing a test base coupled to a pressurized air supply hose, six cap adapters, each of which is configured to be mounted in the test base and receive a certain type of fuel cap to be tested, and a carrying case for carrying a test base and a set of cap adapters to a point of use in the field.

Referring now to FIG. 3, it is shown that a carrying case 74 is provided to receive a test base 24 and air supply hose 30 and one or more cap adapters. As shown in FIG. 3, carrying case 74 includes a rectangular basin 76 formed to include a plurality of adapter-receiving receptacles 78 and a test base-receiving receptacle 80. Each receptacle 78 is sized to receive the lower end of the tubular member 32 included in lower part 60 of a cap adapter 25. Carrying case 74 also includes a lid 82 coupled to basin 76 for pivotable movement between a basin-closing position (not shown) and a basin-opening position shown in FIG. 3. Carrying case 74 also includes a handle 84 and a fastener 86 appended to lid 82 for coupling to a fastener 88 appended to basin 76 to hold lid 822 in its basin-closing position against basin 76.

Each of the cap adapters 125, 225, 325, 425, 525, and 625 shown in FIG. 3 includes the same style of axial lower part 60 and assembly ring 72. One difference between each of those cap adapters is that each cap adapter includes a particularly configured, interchangeable, color-coded, axially upper part like upper part 64 shown in FIG. 2. Each of these axially upper parts 164, 264, 364, 464, 564, and 664 is configured to receive a particular type of fuel cap to be tested and is molded out of a differently colored plastics material. As shown in FIG. 3, the name of the color out of which the axially upper part is molded is also printed in an observable place on the axially upper part so that visually impaired (e.g., colorblind) individuals will be able to determine the differences between the cap adapters included in the set even though they might not be able to distinguish one color from another. Accordingly, of the six cap adapters illustrated in FIG. 3, one has a black axially upper part 164, a second has a blue axially upper part 264, a third has a green axially upper part 364, a fourth has a yellow axially upper part 464, a fifth has a red axially upper part 564, and a sixth has a gray axially upper part 664.

A first cap adapter 125 is shown to scale in FIGS. 4–6. Cap adapter 125 is configured for use on Honda and Acura caps fitting one and one-half inch shallow cam filler necks. Cap adapter 125 includes an axially upper part 164 made of a black color-coded plastics material, an O-ring seal 70 on axially upper part 164, an axially lower part 60, O-ring seal 58, and an assembly ring 72. Axially lower part 60 includes tubular member 32, connector 38, radially outwardly extending annular flange 56, and upright cylindrical portion 62.

Axially upper part 164 includes an axially inner annular portion 166 carrying O-ring seal 70 and configured to mate with and engage upright cylindrical portion 62 of lower part 60 as shown in FIG. 6. Upper part 164 also includes an axially outer portion 168 having one end that is formed to include outer rim 140 and an opposite end that is coupled to axially inner annular portion 166 by a radially outwardly extending annular transition section 169.

Axially upper part 164 further includes first and second retainer flanges 180, 182 as shown in FIG. 5. Each of retainer flanges 180, 182 includes an inclined, helical, first section 184 having an outer edge 186 appended to an inner wall 188 of axially outer portion 168 and subtended by a central angle 190 of about 90°. Each of retainer flanges 180, 182 further includes a horizontal, circumferentially-extending second section 192 having one end coupled to first section 184 and having an outer edge 194 appended to inner wall 188 of axially outer portion 168 and subtended by a central angle 195 of about 32°. A reinforcement lug 196 is appended to the underside of one end of second section 192 and to inner wall 188 as shown in FIG. 6 to provide a positive stop to prevent over-rotation of the test cap.

Annular first and second retainer flanges 180, 182 are positioned to lie on inner wall 188 in end-for-end spaced-apart relation as shown, for example, in FIG. 5 to define spaces 198 for receiving lugs (such as lugs 46 on fuel cap 28 shown in FIGS. 1 and 2) included in a fuel cap that is to be coupled to cap adapter 125 during a fuel cap leakage test. During installation, the lugs (e.g. 46) on the fuel cap to be tested will move along axially upwardly-facing surfaces on the first and second annular flanges 180, 182 as the fuel cap is rotated about axis 97 until they "fall" through lug-receiving spaces 198 in direction 99 and the cap is rotated further about axis 97 to cause each of the lugs to move under annular flanges 180, 182 and engage one of reinforcement lugs 196 included in upper part 164 (see, for example, FIG. 2).

A second cap adapter 225 is shown to scale in FIGS. 7–9. Cap adapter 225 is configured for use on caps fitting one and three-eighths inch filler necks including most 1970's model AMC, Chrysler, and Toyota cars and trucks. Cap adapter 225 includes an axially upper part 264 made of a blue color-coded plastics material, an O-ring seal 70 on axially upper part 264, an axially lower part 60, O-ring seal 58, and an assembly ring 72. Axially lower part 60 includes tubular member 32, connector 38, radially outwardly extending annular flange 56, and upright cylindrical portion 62.

Axially upper part 264 includes an axially inner annular portion 266 carrying O-ring seal 70 and configured to mate with and engage upright cylindrical portion 62 of lower part 60 as shown in FIG. 9. Upper part 264 also includes an axially outer portion 268 having one end that is formed to include outer rim 240 and an opposite end that is coupled to axially inner annular portion 266 by a radially outwardly extending annular transition section 269. An annular portion of transition section 269 is visible through an aperture 71 formed in assembly ring 72 as shown best in FIGS. 8 and 9.

Axially upper part 264 further includes first and second retainer flanges 280, 282 as shown in FIG. 8. Each of retainer flanges 280, 282 includes an inclined, helical, first section 284 having an outer edge 286 appended to an inner wall 288 of axially outer portion 268 and subtended by a central angle 290 of about 750. Each of retainer flanges 280, 282 further includes a horizontal, circumferentially-extending second section 292 having one end coupled to first section 284 and having an outer edge 294 appended to inner wall 288 of axially outer portion 268 and subtended by a central angle 295 of about 32°. A reinforcement lug 296 is appended to the underside of one end of second section 292 and to inner wall 288 as shown in FIG. 9 to provide a positive stop to prevent over-rotation of the test cap.

Annular first and second retainer flanges 280, 282 are positioned to lie on inner wall 288 in end-for-end spaced-apart relation as shown, for example, in FIG. 8 to define spaces 298 for receiving lugs (such as lugs 46 on fuel cap 28 shown in FIGS. 1 and 2) included in a fuel cap that is to be coupled to cap adapter 225 during a fuel cap leakage test. During installation, the lugs (e.g. 46) on the fuel cap to be tested will move along the first and second annular flanges 280, 282 as the fuel cap is rotated about axis 97 until they "fall" through lug-receiving spaces 298 in direction 99 and the cap is rotated further about axis 97 to cause each of the lugs to move under annular flanges 280, 282 and engage one of reinforcement lugs 296 included in upper part 264 (see, for example, FIG. 2).

A third cap adapter 325 is shown to scale in FIGS. 10–12. Cap adapter 325 is configured for use on caps fitting one and one-half inch deep cam filler necks including 1970's model Ford and IHC pickup trucks. Cap adapter 325 includes an axially upper part 364 made of a green color-coded plastics material, an O-ring seal 70 on axially upper part 364, an axially lower part 60, O-ring seal 58, and an assembly ring 72. Axially lower part 60 includes tubular member 32, connector 38, radially outwardly extending annular flange 56, and upright cylindrical portion 62.

Axially upper part 364 includes an axially inner annular portion 366 carrying O-ring seal 70 and configured to mate with and engage upright cylindrical portion 62 of lower part 60 as shown in FIG. 12. Upper part 364 also includes an axially outer portion 368 having one end that is formed to include outer rim 340 and an opposite end that is coupled to axially inner annular portion 366 by a radially outwardly extending annular transition section 369.

Axially upper part 364 further includes first and second retainer flanges 380, 382 as shown in FIG. 11. Each of retainer flanges 380, 382 includes an inclined, helical, first section 384 having an outer edge 386 appended to an inner wall 388 of axially outer portion 368 and subtended by a central angle 390 of about 65°. Each of retainer flanges 380, 382 further includes a horizontal, circumferentially-extending second section 392 having one end coupled to first section 384 and having an outer edge 394 appended to inner wall 388 of axially outer portion 368 and subtended by a central angle 395 of about 50°. A reinforcement lug 396 is appended to the underside of one end of second section 392 and to inner wall 388 as shown in FIG. 12 to provide a positive stop to prevent over-rotation of the test cap.

Annular first and second retainer flanges 380, 382 are positioned to lie on inner wall 388 in end-for-end spaced-apart relation as shown, for example, in FIG. 11 to define spaces 398 for receiving lugs (such as lugs 46 on fuel cap 28 shown in FIGS. 1 and 2) included in a fuel cap that is to be coupled to cap adapter 325 during a fuel cap leakage test. During installation, the lugs (e.g. 46) on the fuel cap to be tested will move along the first and second annular flanges 380, 382 as the fuel cap is rotated about axis 97 until they "fall" through lug-receiving spaces 398 in direction 99 and the cap is rotated further about axis 97 to cause each of the lugs to move under annular flanges 380, 382 and engage one of reinforcement lugs 396 included in upper part 364 (see, for example, FIG. 2).

Figure 14:
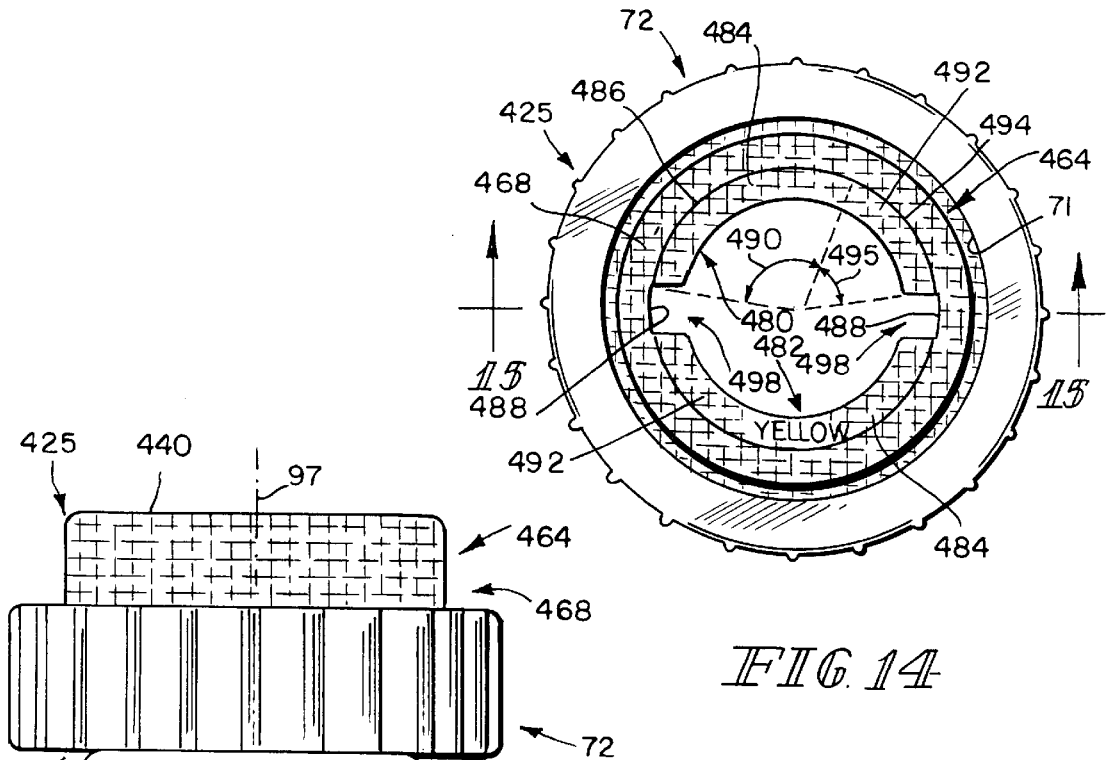
FIGS. 13–15 are several views of a fourth of the six cap adapters, which cap adapter includes a "yellow" color-coded upper part.
Figure 13:
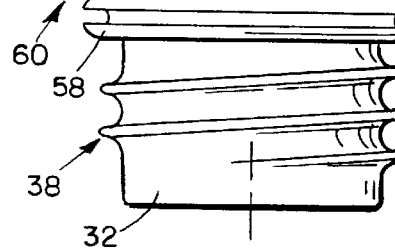
Figure 15:
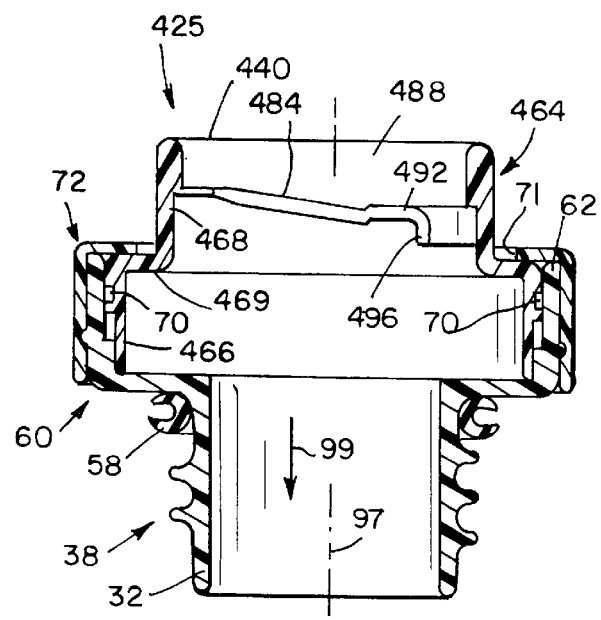

A fourth cap adapter 425 is shown to scale in FIGS. 13–15. Cap adapter 425 is configured for use on caps fitting one and three-eighths deep cam filler necks including many early 1970's General Motors full-size cars and mid-1970's Chrysler cars. Cap adapter 425 includes an axially upper part 464 made of a yellow color-coded plastics material, an O-ring seal 70 on axially upper part 464, an axially lower part 60, O-ring seal 58, and an assembly ring 72. Axially lower part 60 includes tubular member 32, connector 38, radially outwardly extending annular flange 56, and upright cylindrical portion 62.

Axially upper part 464 includes an axially inner annular portion 466 carrying O-ring seal 70 and configured to mate with and engage upright cylindrical portion 62 of lower part 60 as shown in FIG. 15. Upper part 464 also includes an axially outer portion 468 having one end that is formed to include outer rim 440 and an opposite end that is coupled to axially inner annular portion 466 by a radially outwardly extending annular transition section 469. An annular portion of transition section 469 is visible through an aperture 71 formed in assembly ring 72 as shown best in FIGS. 14 and 15.

Axially upper part 464 further includes first and second retainer flanges 480, 482 as shown in FIG. 14. Each of retainer flanges 480, 482 includes an inclined, helical, first section 484 having an outer edge 486 appended to an inner wall 488 of axially outer portion 468 and subtended by a central angle 490 of about 95°. Each of retainer flanges 480, 482 further includes a horizontal, circumferentially-extending second section 492 having one end coupled to first section 484 and having an outer edge 494 appended to inner wall 488 of axially outer portion 468 and subtended by a central angle 495 of about 32°. A reinforcement lug 496 is appended to the underside of one end of second section 492 and to inner wall 488 as shown in FIG. 15 to provide a positive stop to prevent over-rotation of the test cap.

Annular first and second retainer flanges 480, 482 are positioned to lie on inner wall 488 in end-for-end spaced-apart relation as shown, for example, in FIG. 14 to define spaces 498 for receiving lugs (such as lugs 46 on fuel cap 28 shown in FIGS. 1 and 2) included in a fuel cap that is to be coupled to cap adapter 425 during a fuel cap leakage test. During installation, the lugs (e.g. 46) on the fuel cap to be tested will move along the first and second annular flanges 480, 482 as the fuel cap is rotated about axis 97 until they "fall" through lug-receiving spaces 498 in direction 99 and the cap is rotated further about axis 97 to cause each of the lugs to move under annular flanges 480, 482 and engage one of reinforcement lugs 496 included in upper part 464 (see, for example, FIG. 2).

Figure 17:
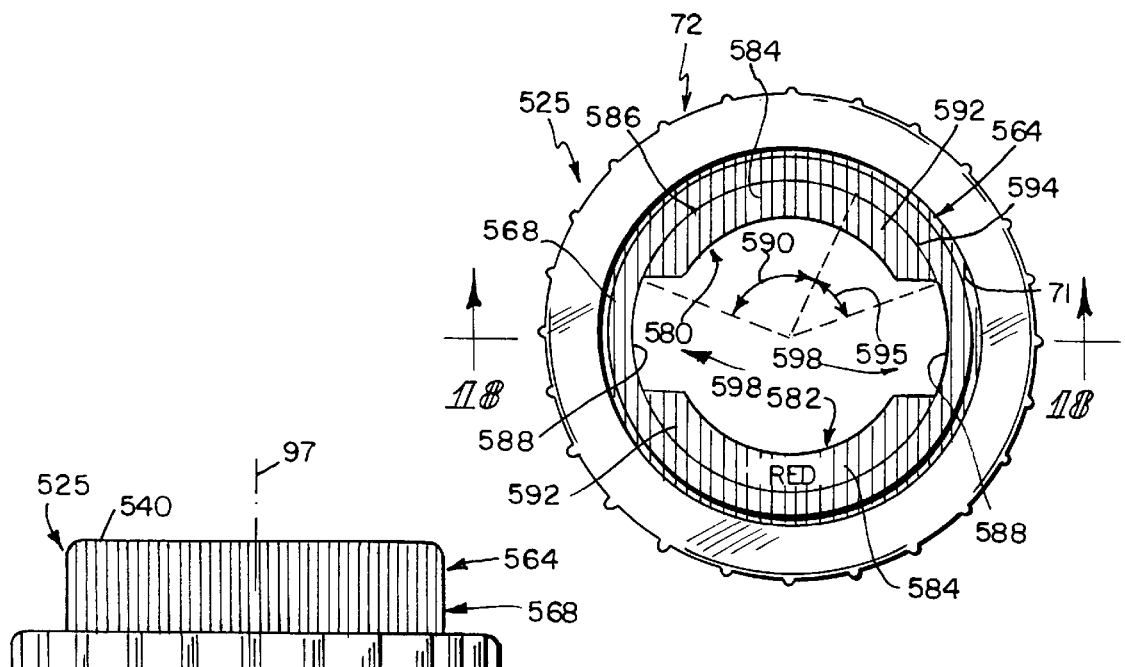
FIGS. 16–18 show several views of a fifth of the six cap adapters, which cap adapter includes a "red" color-coded upper part.
Figure 16:
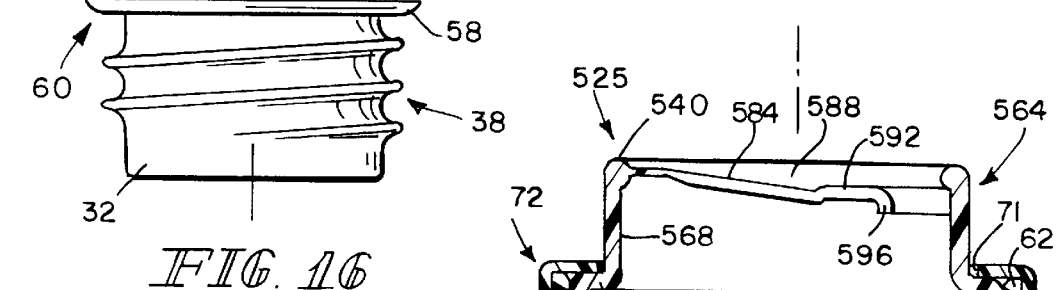
Figure 18:
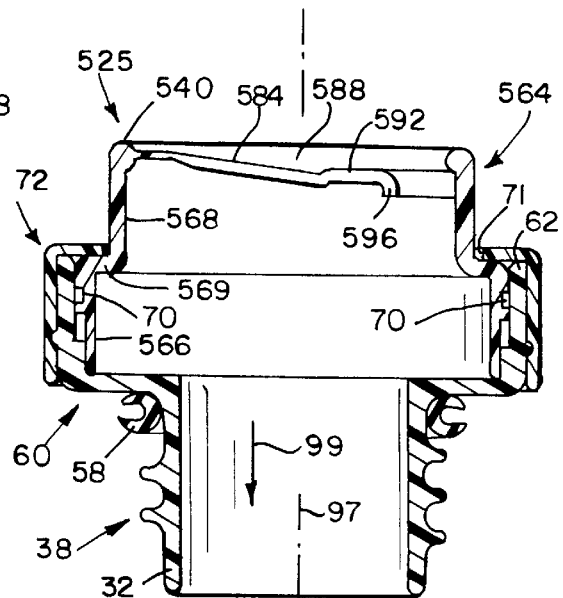

A fifth cap adapter 525 is shown to scale in FIGS. 16–18. Cap adapter 525 is configured for use on caps fitting one and one-half inch shallow cam filler necks including late model Audi, BMW, Mercedes, and 1970's model Ford, Lincoln, and Mercury cars. Cap adapter 525 includes an axially upper part 564 made of a red color-coded plastics material, an O-ring seal 70 on axially upper part 564, an axially lower part 60, O-ring seal 58, and an assembly ring 72. Axially lower part 60 includes tubular member 32, connector 38, radially outwardly extending annular flange 56, and upright cylindrical portion 62.

Axially upper part 564 includes an axially inner annular portion 566 carrying O-ring seal 70 and configured to mate with and engage upright cylindrical portion 62 of lower part 60 as shown in FIG. 18. Upper part 564 also includes an axially outer portion 568 having one end that is formed to include outer rim 540 and an opposite end that is coupled to axially inner annular portion 566 by a radially outwardly extending annular transition section 569.

Axially upper part 564 further includes first and second retainer flanges 580, 582 as shown in FIG. 17. Each of retainer flanges 580, 582 includes an inclined, helical, first section 584 having an outer edge 586 appended to an inner wall 588 of axially outer portion 568 and subtended by a central angle 590 of about 80°. Each of retainer flanges 580, 582 further includes a horizontal, circumferentially-extending second section 592 having one end coupled to first section 584 and having an outer edge 594 appended to inner wall 588 of axially outer portion 568 and subtended by a central angle 595 of about 32°. A reinforcement lug 596 is appended to the underside of one end of second section 592 and to inner wall 588 as shown in FIG. 18 to provide a positive stop to prevent over-rotation of the test cap.

Annular first and second retainer flanges 580, 582 are positioned to lie on inner wall 588 in end-for-end spaced-apart relation as shown, for example, in FIG. 17 to define spaces 598 for receiving lugs (such as lugs 46 on fuel cap 28 shown in FIGS. 1 and 2) included in a fuel cap that is to be coupled to cap adapter 525 during a fuel cap leakage test. During installation, the lugs (e.g. 46) on the fuel cap to be tested will move along the first and second annular flanges 580, 582 as the fuel cap is rotated about axis 97 until they "fall" through lug-receiving spaces 598 and the cap is rotated further about axis 97 to cause each of the lugs to move under annular flanges 580, 582 and engage one of reinforcement lugs 596 included in upper part 564 (see, for example, FIG. 2).

A sixth cap adapter 625 is shown to scale in FIGS. 19–21. Cap adapter 625 is configured for use on Nissan caps fitting one and three-eighths inch shallow cam filler necks. Cap adapter 625 includes an axially upper part 664 made of a gray color-coded plastics material, an O-ring seal 70 on axially upper part 664, an axially lower part 60, O-ring seal 58, and an assembly ring 72. Axially lower part 60 includes tubular member 32, connector 38, radially outwardly extending annular flange 56, and upright cylindrical portion 62.

Axially upper part 664 includes an axially inner annular portion 666 carrying O-ring seal 70 and configured to mate with and engage upright cylindrical portion 62 of lower part 60 as shown in FIG. 21. Upper part 664 also includes an axially outer portion 668 having one end that is formed to include outer rim 640 and an opposite end that is coupled to axially inner annular portion 666 by a radially outwardly extending annular transition section 669. An annular portion of transition section 669 is visible through an aperture 71 formed in assembly ring 72 as shown best in FIGS. 20 and 21.

Axially upper part 664 further includes first and second retainer flanges 680, 682. Each of retainer flanges 680, 682 includes an inclined, helical, first section 684 having an outer edge 686 appended to an inner wall 688 of axially outer portion 668 and subtended by a central angle 690 of about 80°. Each of retainer flanges 680, 682 further includes a horizontal, circumferentially-extending second section 692 having one end coupled to first section 684 and having an outer edge 694 appended to inner wall 688 of axially outer portion 668 and subtended by a central angle 695 of about 32°. A reinforcement lug 696 is appended to the underside of one end of second section 692 and to inner wall 688 as shown in FIG. 21 to provide a positive stop to prevent over-rotation of the test cap.

Annular first and second retainer flanges 680, 682 are positioned to lie on inner wall 688 in end-for-end spaced-apart relation as shown, for example, in FIG. 20 to define spaces 698 for receiving lugs (such as lugs 46 on fuel cap 28 shown in FIGS. 1 and 2) included in a fuel cap that is to be coupled to cap adapter 625 during a fuel cap leakage test. During installation, the lugs (e.g. 46) on the fuel cap to be tested will move along the first and second annular flanges 680, 682 as the fuel cap is rotated about axis 97 until they "fall" through lug-receiving spaces 698 in direction 99 and the cap is rotated further about axis 97 to cause each of the lugs to move under annular flanges 680, 682 and engage one of reinforcement lugs 696 included in upper part 664 (see, for example, FIG. 2).

Figures 22, 23:
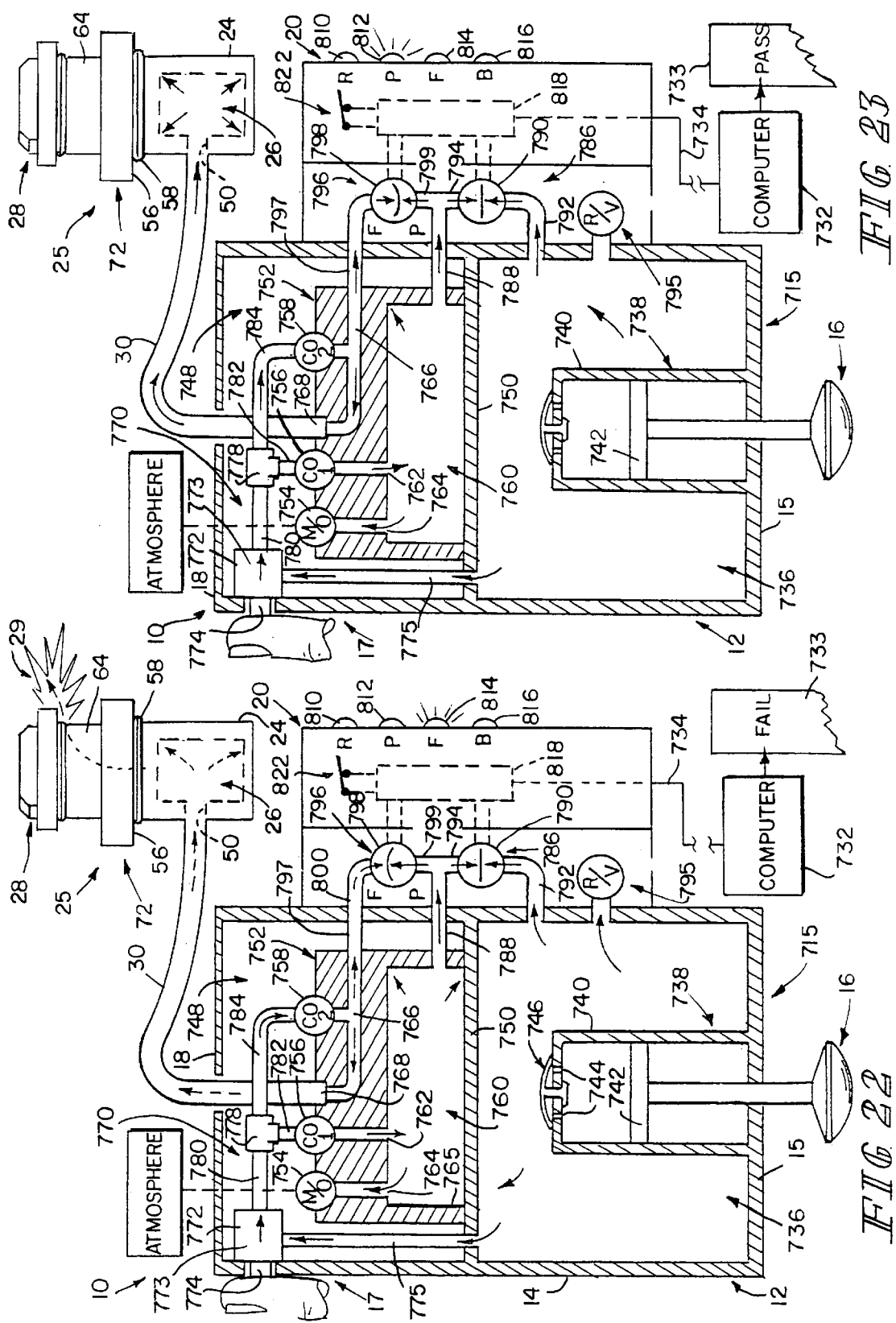
FIGS. 22 and 23 show schematic diagrams of air flow in a fuel cap leakage tester during various stages of operation of the tester unit.

A schematic diagram of fuel cap leakage test system 10 showing the state of system 10 during a cap-failing test procedure is shown in FIG. 22. A schematic diagram showing the state of system 10 during a cap-passing test procedure is shown in FIG. 23.

Housing 14 includes a reservoir chamber 736 for containing a supply of pressurized air and a pump 738 for pressurizing air in reservoir chamber 736 as shown in FIG. 22. Pump 738 includes a cylinder 740 positioned to lie in reservoir chamber 736 and fixed to right-side end 715 of housing 14, a piston 742 movable in cylinder 740 and coupled to pump handle 16, air flow apertures 744 formed in cylinder 740 through apertures 744, and a one-way check valve 746 for allowing one-way air flow out of cylinder 740 into reservoir chamber 736.

Housing 14 also includes a metering chamber 748 positioned to lie between reservoir chamber 736 and end cover 18 and to receive one end of pressurized air supply hose 30. A partition member 750 is mounted in an interior region of housing 14 to divide the interior region into a first cavity defining reservoir chamber 736 and a second cavity defining metering chamber 748.

A metering block 752 is positioned to lie in metering chamber 748 in engagement with partition member 750 as shown diagrammatically in FIG. 22. In a preferred embodiment, metering block 752 is formed to include a master orifice (M/O) 754 having a first specified flow rate at a specified test pressure (e.g. 60 cc/min at 30 inches of water {7.5 kPa}), a first control orifice (C01) 756 having a second specified flow rate at the specified test pressure and a second control orifice (C02) 758 having a specified flow rate at the specified test pressure that is equivalent to the first control orifice 756. Master orifice 754 defines master air flow restriction and first and second control orifices 756, 758 define first and second air flow restrictions.

Meter block 752 is formed to include a damper chamber 760, a conduit 762 interconnecting first control orifice 756 and damper chamber 760, and a conduit 764 interconnecting damper chamber 760 and master orifice 754. Illustratively, partition member 750 engages meter block 752 to close an open mouth 765 of damper chamber 760. Conduit 762, damper chamber 760, and conduit 764 cooperate to define a first passage for conducting pressurized air from first control orifice 756 to master orifice 754 for discharge into the atmosphere (illustratively via metering chamber 748). The volume of damper chamber 760 is selected in the manner described below to balance the volume of pressurized air in the first passage 762, 760, 764 with the volume of air in a second passage between the second control orifice 758 and the base chamber 26 in test base 24 so that the flow rates of pressurized air passing through those two passages will reach equilibrium substantially simultaneously during a fuel cap leakage test conducted using system 10.

Meter block 752 is also formed to include an air supply conduit 766 interconnecting second control orifice 758 and a fitting 768 connected to pressurized air supply hose 30. The second passage referred to above is defined by air supply conduit 766, air supply hose 30, and base chamber 26.

An air supply system 770 is provided for selectively conducting pressurized air from reservoir chamber 736 to each of first and second control orifices 756, 758. Air supply system 770 includes a test actuator switch 772 including a normally closed flow control valve 773 and a valve operator 774, a switch intake conduit 775 interconnecting reservoir chamber 736 and flow control valve 773, a flow junction 778, and a switch discharge conduit 780 interconnecting flow control valve 773 and flow junction 778. Air supply system 770 further includes a first air supply conduit 782 interconnecting flow junction 778 and first control orifice 756, and a second air supply conduit 784 interconnecting flow junction 778 and second control orifice 758. When a test system operator pushes valve operator 774 inwardly, the normally closed flow control valve 773 will be opened and pressurized air will flow from reservoir chamber 736 through first control orifice 756 into first passage 762, 760, 764 to reach master orifice 754 and simultaneously through second control orifice 758 into second passage 766, 30, 26 to reach the cap 28 to be tested.

The cap 28 to be tested will "fail" the leakage test if the pressure in the second passage 766, 30, 26 coupled to the cap 28 is lesser than the pressure in the first passage 762, 760, 764 open to the atmosphere at master orifice 754 because such a result means that more pressurized air is leaking past the cap 28 mounted in test base 24 than is "leaking" (i.e. being discharged at a controlled rate) through master orifice 754—which is calibrated to discharge pressurized air at the specification limit for acceptable fuel cap leakage. Said another way, the cap 28 to be tested will fail the test if the flow rate of pressurized air in the second passage 766, 30, 26 is greater than the flow rate of pressurized air in the first passage 762, 760, 764.

In contrast, the cap 28 to be tested will "pass" the leakage test if pressure in the second passage 766, 30, 26 coupled to cap 28 is greater than the pressure in the first passage 762, 760, 764 open to the atmosphere at master orifice 754 because such a result means that less pressurized air is leaking past the cap 28 mounted in test base 24 than is "leaking" (i.e. being discharged at a controlled rate) through calibrated master orifice 754. Said another way, the cap 28 to be tested will pass the test if the flow rate of pressurized air in the second passage 766, 30, 26 is lesser than the flow rate of pressurized air in the first passage 762, 760, 764. It will be understood that the leakage specification limit tested by system 10 can thus be varied by changing (e.g. increasing or decreasing) the internal diameter of master orifice 754. To test for "zero" leakage past a cap 28 mounted in test base 24 it would thus be necessary to block discharge of any pressurized air through master orifice 754.

A reservoir pressure detector 786 is provided for sensing the level of pressure in reservoir chamber 736. Illustratively, a "first passage" conduit 788 communicating with damper chamber 760 (and thus first passage 762, 760, 764) extends outwardly from meter block 752. Reservoir pressure detector 786 includes a commercially available differential pressure transducer 790 having two inputs and lying in electronics module 20, a transducer supply conduit 792 communicating air from reservoir chamber 736 to one input of differential pressure transducer 790, and a transducer supply conduit 794 communicating air from first passage 762, 760, 764 via first passage conduit 788 to another input of differential pressure transducer 790.

A pressure-relief valve 795 is provided for venting excess pressure from reservoir chamber 136. Pressure-relief valve 795 is positioned in electronics module 20 and configured to receive pressurized air from reservoir chamber 736.

A cap leakage detector 796 is provided for comparing the pressure level in the first passage 762, 760, 764 coupled to master orifice 754 to the pressure level in the second passage 766, 730, 26 coupled to test base 26. Illustratively, a "second passage" conduit 797 lying partly in meter block 752 and communicating with air supply conduit 766 in meter block 752 extends outwardly from meter block 752. Cap leakage detector 796 includes a commercially available differential pressure transducer 798 having two inputs and lying in electronics module 20, a transducer supply conduit 799 communicating air from "first passage" conduit 788 to one input of differential pressure transducer 798, and a transducer supply conduit 800 communicating air from "second passage" conduit 797 to another input of differential pressure transducer 798.

Several operator signal lights are mounted in electronics module 20 for observation by an operator using test system 10. These lights include a ready-to-test signal light "R" 810, a passing signal light "P" 812, a failing signal light "F" 814, and a low battery signal light "B" 816. An electrical circuit 818 is provided for using signals provided by pressure level detector 786, cap leakage detector 796, and module batteries (not shown) to illuminate lights 810, 812, 814, and 816 at proper times during a fuel cap test cycle. Various features of transducers 790, 798 and circuit 818 are disclosed in U.S. Pat. Nos. 5,049,421 relating to Transducer Glass Bonding Technique; U.S. Pat. No. 4,996,627 relating to High Sensitivity Miniature Pressure Transducer; U.S. Pat. Nos. 5,019, 783 and 5,028,876 relating to Precision Capacitive Transducers; U.S. Pat. No. 5,048,165 relating to Sensitivity Controlling Methods; U.S. Pat. Nos. 4,071,838; 4,597,003; 4,584,885; 4,600,834, and 4,783,237, which references are hereby incorporated by reference herein.

A motion-activated switch 822 is mounted in the electronic module 20 and coupled to circuit 818. This is illustratively a vibration sensitive "trembler" switch that activates whenever a test unit operator picks up test unit 12 prior to a test. Activation of this switch 822 in response to movement of test unit of 12 will activate pressure level detector 786, cap leakage detector 796, and circuit 818 so that signal lights 810,812, 814, and 816 will operate at the proper times during a test cycle in response to signals received from reservoir pressure detector 786 and cap leakage detector 796.

Prior to an initial test cycle, the pressure level in reservoir chamber 736 is approximately atmospheric. The pressure level in first passage 762, 760, 764 is also expected to be approximately atmospheric because first passage 762, 760, 764 is vented to the atmosphere through master orifice 754. Further, the pressure level in base chamber 26 is also expected to be atmospheric because a cap 28 to be tested has not yet been installed in test base 24 and base chamber 26 is open to the atmosphere.

At this initial stage, the differential pressure transducer 790 in reservoir pressure detector 786 is exposed to equal pressures at each input. The pressure inputs to differential pressure transducer 790 are equivalent because atmospheric pressure is communicated to one input via transducer supply conduit 792 and atmospheric pressure is also communicated to the other input of pressure differential transducer 790 by first passage conduit 788 and transducer supply conduit 794. Likewise, at this initial stage of a test cycle, the differential pressure transducer 798 included in cap leakage detector 796 is also exposed to equal atmospheric pressures from transducers supply conduits 799 and 800.

If test unit 12 is coupled to a host computer 732 by a communication line 734 and network (not shown) then the test operator will next check a computer monitor to obtain information about the cap to be tested. Electronic module 20 is coupled to a remote host computer 732 by communication line 734 and network (not shown) to enable supervising officials resident at one or more central locations to monitor the test results of each cap tested using fuel cap leakage tester system 10 throughout the geographic region monitored by those officials. During an official state vehicle inspection conducted using system 10, an inspector would enter the vehicle identification number of a vehicle carrying a cap to be tested and then test the cap carried by that vehicle using system 10 to determine whether that cap passed or failed the fuel cap leakage test established by system 110. The results of such test would then be communicated from electronics module 20 to host computer 132 over communication line 734 for storage and observation.

In some cases, it will be necessary to mount cap 28 on an adapter 25 prior to insertion of the cap 28 into test base 24 to facilitate mounting of the cap 28 into test base 24. As noted above, adapters to fit fuel caps for a wide variety of vehicles and model years will be made available to the test operator to enable the operator to mount virtually any fuel cap in a standard test base 24. The vehicle fuel cap is then removed from the vehicle and installed on the test base 24. It may be more convenient for some users to install the fuel cap 128 on the adaptor before installing the adapter 25 on test base 124. In either case, a cap to be tested is coupled to test base 24 before the test is conducted.

The test operator will now begin to use pump 738 to increase the level of pressure of air in reservoir chamber 736 in test unit 12. In a presently preferred embodiment, it is desired to increase the air pressure in pressure reservoir 736 to 37 inches of water. Pump handle 16 is reciprocated by the test operator to cause the pressure level in reservoir chamber 736 to increase. Air contained in cylinder 740 is discharged from cylinder 740 through air flow apertures 744 and past the deflected oneway check valve 746 to charge the reservoir chamber 736. It is expected that the test operator will need to move pump handle 16 from one to four strokes depending upon the time interval between fuel cap leakage tests.

Turning now to FIG. 22, it will be seen that reservoir pressure detector 786 has detected that the pressure level in reservoir chamber 736 is substantially equivalent to the pressure level in damper chamber 760. This is illustrated diagrammatically by using a straight line symbol in the differential pressure transducer 790 included in reservoir pressure detector 786.

As also shown in FIG. 22, a cap that has a poor seal ring and is thus unable to pass the test specification established by fuel cap leakage test system 10 has now been installed in test base 24. Cap leakage detector 796 has detected that the pressure in first passage 762, 760, 764 is greater than the pressure level in second passage 766, 30, 26, and thus failing signal light "F" has been illuminated to indicate that cap 28 is a failing cap. Dotted air flow lines are shown in second passage 766, 30, 26 to signify that the pressure in that second passage is lower than the pressure in first passage 762, 760, 764. The pressure in the second passage is lower because pressurized air being conducted to base chamber 26 is leaking at leak symbol 29 at an unacceptable rate from base chamber 26 around a poor seal (not shown) appended to cap 28 that is undergoing a leakage test. It should be noted that the test operator is continuing to depress valve operator 774 manually during this stage of the test as shown in FIG. 22.

FIG. 22 also shows that test information indicating a failing cap is provided to a remote host computer 732 by a communication line 734 and network at the same time the test is being conducted by the test operator. This is helpful in the case of state inspections where a central state inspection agency wishes to know the results of any particular fuel cap test at the time that the test is occurring. The information about the vehicle identification and the test results are communicated instantaneously to a remote host computer by a circuit 818 using a communication line 734 and network so that this information can be recorded at the central state inspection agency database 733 along with the vehicle identification number and any other related or vehicle owner information for future use.

FIG. 23 is a view very similar to the diagrammatic view shown in FIG. 22 but in this case, the cap 28 to be tested is a "passing" cap. In other words, the cap 28 either does not leak at all or leaks at a rate that is lower than the rate that pressurized air "leaks" (i.e. is discharged through) master orifice 754 formed in meter block 752. As shown in FIG. 23, the pressure level of pressurized air in second passage 766, 30, 26 is greater than the pressure level of pressurized air in first passage 762, 760, 764. This difference in pressure is illustrated diagrammatically by a downwardly bowed shallow curve symbol in the differential pressure transducer 798 included in cap leakage detector 796. As shown in FIG. 23, cap leakage detector 796 has instructed circuit 818 to illuminate passing signal light "P" to indicate that the cap 28 being tested does not leak at all or leaks at a low rate within an acceptable specified range. Again, information about the passing results of this test are communicated to a remote host computer 732 by a communication line 734 and network for later use.

In the course of conducting a test, if neither the passing or failing signal lights "P" and "F" are illuminated in the normal time interview, the test operator should continue to hold the test button 774 for a few seconds, and circuit 818 will cause both the passing signal light "P" and the failing signal light "F" to come on simultaneously for a moment. This result indicates "no test" and the procedure described above should be repeated.

Although the invention has been described in detail with reference to certain preferred embodiments, variations and modifications exist within the scope and spirit of the invention as described and defined in the following claims.

We claim:

1. A fuel cap tester kit having component parts capable of being assembled in the field at a fuel cap leakage testing site to provide a fuel cap leakage tester configured to accept and test more than one style of fuel cap, each fuel cap having a filler neck closure portion and an outer shell coupled to the filler neck closure portion, the kit comprising the combination of a test base formed to include a base chamber and a pressurized air supply conduit in fluid communication with the base chamber and at least two cap adapters, each cap adapter being formed to include a pressurized air supply passageway and a cap-receiving chamber adapted to receive a fuel cap to be tested therein and connected to the pressurized air supply passageway, each cap adapter including a threaded connector adapted to engage a cooperating configured threaded connector in the test base to communicate pressurized air from the base chamber to the cap-receiving chamber through the pressurized air supply passageway, an outer rim providing a mouth opening into the cap-receiving chamber, and a retainer adapted to mechanically fasten and retain a filler neck closure portion of a fuel cap to be tested in a mounted position extending into the cap-receiving chamber and closing the mouth opening into the cap-receiving chamber preparatory to determining a leakage rate of pressurized air from the cap-receiving chamber through the mouth opening.

2. The kit of claim 1, wherein the retainer of a first of the cap adapters is configured to retain a first style of fuel cap in the mounted position on the first cap adapter and the retainer of a second of the cap adapters is configured to retain a second style of fuel cap different from the first style of fuel cap in the mounted position on the second cap adapter.

3. The kit of claim 2, wherein the retainer of a third of the cap adapters is configured to retain a third style of fuel cap different from each of the first and second styles of fuel caps in the mounted position on the third cap adapter.

4. The kit of claim 3, wherein the retainer means of a fourth of the cap adapters is configured to retain a fourth style of fuel cap different from each of the first, second, and third styles of fuel caps in the mounted position on the fourth cap adapter.

5. The kit of claim 1, further comprising an air supply hose and a hose connector coupled to the hose and the test base to hold the air supply hose in fluid communication with the pressurized air supply conduit formed in the test base to enable pressurized air to pass from the air supply hose to the base chamber through the pressurized air supply conduit.

6. The kit of claim 1, wherein the test base includes a side wall and a bottom wall coupled to the side wall and the side wall and bottom wall cooperate to define the base chamber.

7. The kit of claim 1, wherein each cap adapter further includes a tubular member formed to include the pressurized air supply passageway, an annular flange adjacent to the tubular member, and an O-ring seal abutting the tubular member and the annular flange.

8. The kit of claim 7, wherein each cap adapter further includes an annular wall positioned to lie between the annular flange and the outer rim and formed to include the cap-receiving chamber and the retainer includes at least one cap-retainer flange coupled to the annular wall to lie in the cap-receiving chamber.

9. The kit of claim 7, wherein each cap adapter further includes an annular wall positioned to lie between the annular flange and the outer rim and formed to include the cap-receiving chamber and the retainer includes cap-retainer threads coupled to the annular wall to lie in the cap-receiving chamber.

10. The kit of claim 7, wherein the connector is appended to the tubular member.

11. The kit of claim 10, wherein the connector is defined by external threads formed on the tubular member to position the O-ring seal between the external threads and the annular flange.

12. The kit of claim 7, wherein the test base includes an outer rim defining a mouth opening into the base chamber and the connector of each cap adapter is defined by means on the tubular member for engaging the test base to trap the O-ring seal in sealing relation between the outer rim on the test base and the annular flange and to position the tubular member in the base chamber so that any pressurized air extant in the base chamber passes through the pressurized air supply passageway formed in the tubular member to the cap-receiving chamber.

13. The kit of claim 12, wherein the base includes internal threads positioned to lie in the base chamber and the engaging means includes external threads mating with the internal threads of the test base.

14. The kit of claim 11, wherein the test base includes internal threads positioned to lie in the base chamber and the connector of each cap adapter includes external threads appended to the tubular member and arranged to mate with the internal threads of the test base.

15. The kit of claim 14, wherein the tubular member further includes an outlet end communicating with the cap-receiving chamber, an inlet end lying in spacedapart relation to the outlet end, and an exterior wall extending between the inlet and outlet ends and carrying the external threads and each cap adapter further includes an O-ring seal surrounding the exterior wall of the tubular member and lying between the external threads and the outlet end.

16. The kit of claim 1, wherein each cap adapter further includes an annular wall formed to include the cap-receiving chamber and the retainer includes at least one cap-retainer flange coupled to the annular wall.

17. The kit of claim 1, wherein each cap adapter further includes an annular wall formed to include the cap-receiving chamber and the retainer includes capretainer threads.

18. A fuel cap tester kit having component parts capable of being assembled in the field at a fuel cap leakage tester to provide a fuel cap leakage tester configured to accept and test a fuel cap having a filler neck closure portion and an outer shell coupled to the filler neck closure portion, the kit comprising the combination of
a test base formed to include a base chamber and a pressurized air supply conduit in fluid communication with the base chamber and
a cap adapter formed to include a pressurized air supply passageway and a cap-receiving chamber adapted to receive a fuel cap to be tested therein and coupled to the pressurized air supply passageway, the cap adapter including a connector adapted to engage the test base via a cooperating configured threaded connector thereon to communicate pressurized air from the base chamber to the cap-receiving chamber through the pressurized air supply passageway, an outer rim providing a mouth opening into the cap-receiving chamber, and a retainer adapted to mechanically fasten and retain a filler neck closure portion of a fuel cap to be tested in a mounted position extending into the cap-receiving chamber and closing the mouth opening into the cap-receiving chamber preparatory to determining a leakage rate of pressurized air from the cap-receiving chamber through the mouth opening.

19. The kit of claim 18, further comprising an air supply hose and a hose connector coupled to the hose and the test base to hold the air supply hose in fluid communication with the pressurized air supply conduit formed in the test base to enable pressurized air to pass from the air supply hose to the base chamber through the pressurized air supply conduit.

20. The kit of claim 18, wherein the test base includes a side wall and a bottom wall coupled to the side wall and the side wall and bottom wall cooperate to define the base chamber.

21. The kit of claim 20, wherein the side wall includes an internal flange and the connector of the cap adapter includes an external flange arranged to mate with the internal flange on the side wall.

22. The kit of claim 20, wherein the side wall includes an annular surface and internal threads positioned on the annular surface to lie in the base chamber and the connector of the cap adapter includes a tubular member formed to include the pressurized air supply passageway and external threads appended to the tubular member and arranged to mate with the internal threads on the annular surface.

23. The kit of claim 20, wherein the side wall is a cylindrical tube having openings at opposite ends thereof and the bottom wall is a round disk positioned to lie in one of the openings formed in the cylindrical tube.

24. The kit of claim 23, wherein the cylindrical tube includes an annular surface defining the base chamber and internal threads positioned on the annular surface to lie in the base chamber and the connector of the adapter includes a tubular member formed to include the pressurized air supply passageway and external threads appended to the tubular member and arranged to mate with the internal threads on the annular surface.

25. The kit of claim 20, wherein the side wall is formed to include the pressurized air supply conduit.

26. The kit of claim 25, wherein the side wall includes an annular surface defining the base chamber and internal threads positioned on the annular surface to lie in the base chamber and engage the connector, the annular surface includes a lower portion positioned to lie between the internal threads and the bottom wall, and the lower portion of the annular surface is formed to include the pressurized air supply conduit.

27. The kit of claim 25, further comprising an air supply hose and a hose connector coupled to the hose and the side wall to hold the air supply hose in fluid communication with the pressurized air supply conduit formed in the side wall to enable pressurized air to pass from the air supply hose to the base chamber through the pressurized air supply conduit.

28. The kit of claim 18, wherein the cap adapter includes a tubular member formed to include the pressurized air supply passageway, an annular flange adjacent to the tubular member, and an O-ring seal abutting the tubular member and the annular flange.

29. The kit of claim 28, wherein the cap adapter further includes an annular wall positioned to lie between the annular flange and the outer rim and formed to include the cap-receiving chamber and the retainer includes at least one cap-retainer flange coupled to the annular wall to lie in the cap-receiving chamber.

30. The kit of claim 28, wherein the cap adapter further includes an annular wall positioned to lie between the annular flange and the outer rim and formed to include the cap-receiving chamber and the retainer includes cap-retainer threads coupled to the annular wall to lie in the cap-receiving chamber.

31. The kit of claim 28, wherein the connector is appended to the tubular member.

32. The kit of claim 31, wherein the connector is defined by external threads formed on the tubular member to position the O-ring seal between the external threads and the annular flange.

33. The kit of claim 28, wherein the test base includes an outer rim defining a mouth opening into the base chamber and the connector of the cap adapter is defined by means on the tubular member for engaging the test base to trap the O-ring seal in sealing relation between the outer rim on the base and the annular flange and to position the tubular member in the base chamber so that any pressurized air extant in the base chamber passes through the pressurized air supply passageway formed in the tubular member to the cap-receiving chamber.

34. The kit of claim 33, wherein the test base includes internal threads positioned to lie in the base chamber and the engaging means includes external threads mating with the internal threads of the base.

35. The kit of claim 28, wherein the test base includes internal threads positioned to lie in the base chamber and the connector of the cap adapter includes external threads appended to the tubular member and arranged to mate with the internal threads of the test base.

36. The kit of claim 35, wherein the tubular member further includes an outlet end communicating with the cap-receiving chamber, an inlet end lying in spaced-apart relation to the outlet end, and an exterior wall extending between the inlet and outlet ends and carrying the external threads and the connector of the cap adapter further includes an O-ring seal surrounding the exterior wall of the tubular member and lying between the external threads and the outlet end.

37. A fuel cap tester comprising
a test base formed to include a base chamber and a pressurized air supply conduit in fluid communication with the base chamber and
a cap adapter including a tubular member formed to include a cap-receiving chamber, a flange around the tubular member, and an O-ring seal around the tubular member adjacent to the flange, the tubular member including an axially inner end, an inner portion positioned to lie between the axially inner end and the O-ring seal and sized to fit in the base chamber, and an axially outer end opposite to the axially inner end, a base connector on the inner portion to threadingly couple the cap-receiving chamber in the cap adapter in fluid communication with the base chamber in the test base by means of cooperating configured threads thereon, and a fuel cap connector on the axially outer end to mechanically fasten and retain fuel cap to be tested in the cap-receiving chamber.

38. The tester of claim 37, further comprising an air supply hose and a hose connector coupled to the hose and the test base to hold the air supply hose in fluid communication with the pressurized air supply conduit formed in the test base to enable pressurized air to pass from the air supply hose to the base chamber through the pressurized air supply conduit.

39. The tester of claim 38, wherein the test base includes an interior side wall formed to include internal threads and an interior bottom wall coupled to the interior side wall, the interior side wall and bottom wall cooperate to define the base chamber, and the base connector on the cap adapter is defined by external threads configured to mate with the internal threads formed on the interior side wall of the base.

40. The tester of claim 39, the test base includes an outer rim defining a mouth opening into the base chamber and the connector of the cap adapter is defined by means on the tubular member for engaging the test base to trap the O-ring seal in sealing relation between the outer rim on the test base and the annular flange and to position the tubular member in the base chamber so that any pressurized air extant in the base chamber passes through the pressurized air supply passageway formed in the tubular member to the cap-receiving chamber.

41. The tester of claim 37, wherein the test base includes a side wall and a bottom wall coupled to the side wall and the side wall and bottom wall cooperate to define the base chamber.

42. The tester of claim 41, wherein the side wall is formed to include an outer rim and threads positioned to lie between the outer rim and the bottom wall.

43. The tester of claim 42, wherein the side wall further includes a cylindrical upper wall portion lying between the outer rim and the threads and a cylindrical lower wall portion lying between the threads and the bottom wall.

44. The tester of claim 43, further comprising an air supply hose and a hose connecter coupled to the air supply hose and to the cylindrical lower wall portion to hold the air supply hose in fluid communication with the pressurized air supply conduit formed in the test base to enable pressurized air to pass from the air supply hose to the base chamber through the pressurized air supply conduit.

45. The tester of claim 42, wherein the threads are axially offset from the outer rim by a distance of about 0.525 inch (1.3335 cm).

46. The tester of claim 45, wherein the side wall further includes an annular unthreaded upper wall lying between the outer rim and the threads.

* * * * *